United States Patent [19]

Ludwigson

[11] 4,266,989
[45] May 12, 1981

[54] CUTTING TOOL GUIDING SYSTEM FOR METAL CUTTING MACHINES

[75] Inventor: Robert G. Ludwigson, Brookfield, Wis.

[73] Assignee: C-R-O, Inc., Menomonee Falls, Wis.

[21] Appl. No.: 89,405

[22] Filed: Oct. 30, 1979

[51] Int. Cl.³ .............................................. B23K 7/00
[52] U.S. Cl. ................................... 148/9 R; 83/364; 83/368; 266/50; 266/67; 266/73
[58] Field of Search ........................ 266/50, 67, 68, 69, 266/72, 73, 76; 148/9 R; 83/425, 364, 368

[56] References Cited

U.S. PATENT DOCUMENTS

| | | | |
|---|---|---|---|
| 1,324,005 | 12/1919 | Bucknam | 266/72 |
| 2,015,329 | 9/1935 | Anderson | 266/67 |
| 2,283,347 | 5/1942 | Young | 266/70 |
| 2,493,033 | 1/1950 | Russell et al. | 266/69 |
| 2,606,754 | 8/1952 | Tyrner | 266/73 |
| 2,617,644 | 11/1952 | Helmkamp | 266/58 |
| 3,929,324 | 12/1975 | Lotz et al. | 266/50 |
| 4,168,056 | 8/1979 | Haley | 266/73 |

Primary Examiner—L. Dewayne Rutledge
Assistant Examiner—John P. Sheehan
Attorney, Agent, or Firm—Andrus, Sceales, Starke & Sawall

[57] ABSTRACT

A cantilevered transverse arm is mounted for movement along both a longitudinal and transverse axis. The outer end of the arm is adapted to be disposed over a metal slab to be cut and carries a tool assembly which is adjustable thereon. A guiding assembly is fixedly mounted to the arm and includes a pair of longitudinally spaced guide rollers positioned so that the cutting tool is disposed in a transverse plane extending between the rollers. Each roller is individually shiftable into and out of engagement with the slab edge. Initially, the leading roller is advanced toward the slab edge, while the trailing roller is retracted. The rollers are then moved toward the slab edge until the leading roller engages the said edge ahead of the slab corner. As the entire device moves longitudinally along the slab, the leading roller is retracted while the trailing roller moves into engagement with the slab edge. Deformed slab corners are thereby bypassed by the tool guidance system.

5 Claims, 7 Drawing Figures

CUTTING TOOL GUIDING SYSTEM FOR METAL CUTTING MACHINES

U.S. PRIOR ART OF INTEREST

U.S. Pat. No. 2,283,347, Young, May 19, 1942
U.S. Pat. No. 2,493,033 Russell et al, Jan. 3, 1950
U.S. Pat. No. 2,617,644 Helmkamp, Nov. 11, 1952
U.S. Pat. No. 3,929,324 Lotz et al, Dec. 30, 1975

BACKGROUND AND SUMMARY OF THE INVENTION

This invention relates to a cutting tool guiding system for metal cutting machines.

In the manufacture of steel plates and sheets, it is desirable to start with metal slabs which are an optimum width for the particular end product desired. Many such slabs are formed on continuous casting machines and are often wider than necessary. It is usually the practice to slit such slabs longitudinally into two or more strips.

The original slabs are often separated from the continuous cast strand by a flame cut-off device which utilizes a cutting torch which is moved transversely across the strand. The separated slab has often been found to have corners which are deformed in that they contain slag, or are rounded. These deformities have caused problems with prior guidance systems for slitting the slab when such systems followed the slab edge. Furthermore, at least some prior edge following devices have also had to contend with warped or misplaced slabs.

The present invention overcomes the aforementioned problems and provides a longitudinal cutting device which is edge-guided by a system which is not affected by corner deformities or warpage or misplacement of the slab.

In accordance with the various aspects of the invention, a cantilevered transverse arm is mounted for movement along both a longitudinal and transverse axis. The outer end of the arm is adapted to be disposed over a metal slab to be cut and carries a tool assembly which is adjustable thereon. A guiding assembly is fixedly mounted to the arm and includes a pair of longitudinally spaced guide rollers positioned so that the cutting tool is disposed in a transverse plane extending between the rollers. Each roller is individually shiftable into and out of engagement with the slab edge.

Initially, the leading roller is advanced toward the slab edge, while the trailing roller is retracted. The rollers are then moved toward the slab edge until the leading roller engages the said edge ahead of the slab corner. As the entire device moves longitudinally along the slab, the leading roller is retracted while the trailing roller moves into engagement with the slab edge. Deformed slab corners are thereby bypassed by the tool guidance system.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
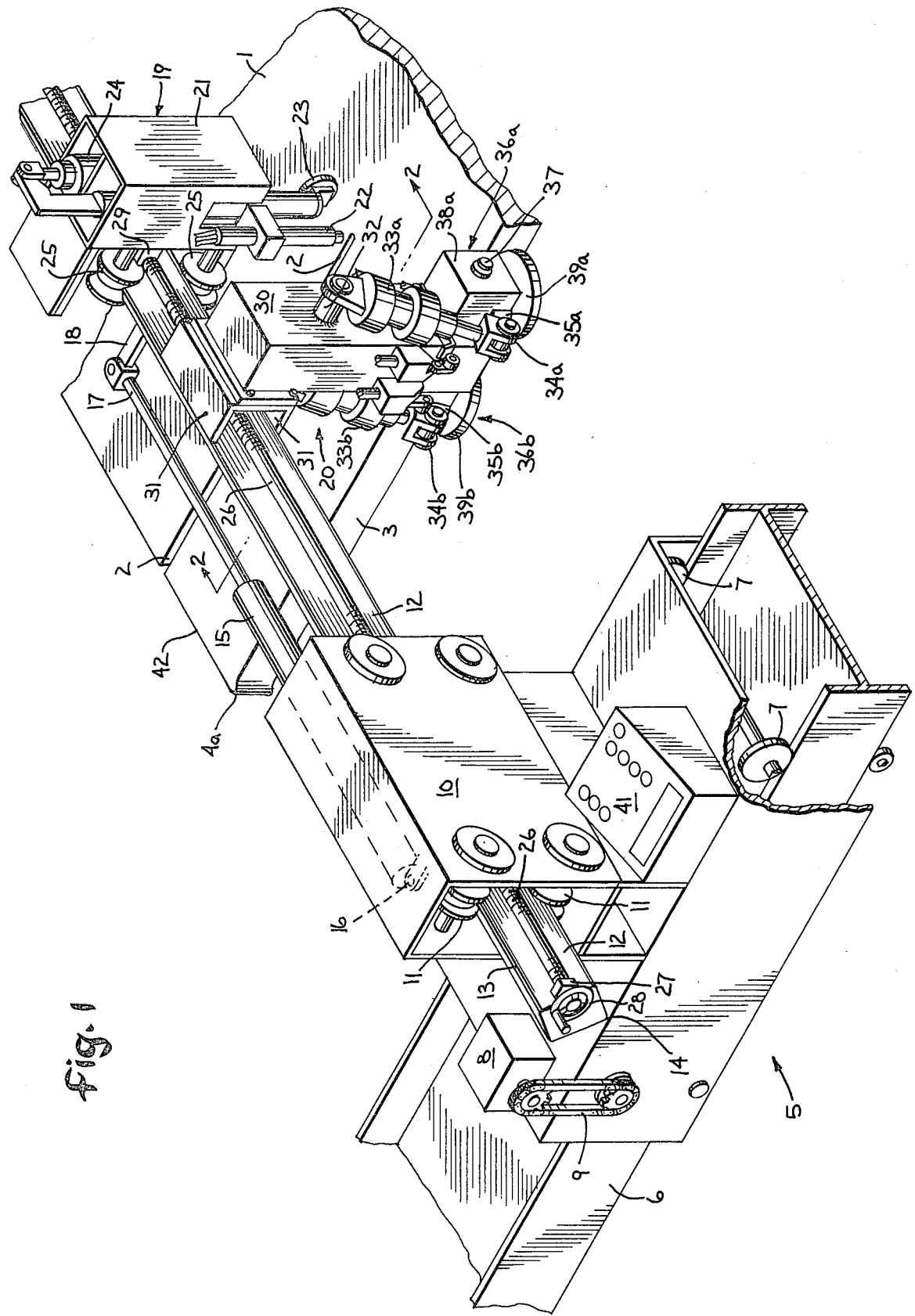
FIG. 1 is a schematic perspective view of a cutting tool guiding system constructed in accordance with the invention.

Referring to FIG. 1, the concepts of the invention are adapted for use in a machine for cutting a fixed plate-like metal slab 1 in a longitudinal direction along a seam 2. As shown, slab 1 has an exposed longitudinal edge 3 and a corner portion 4a which has a projection-like deformity.

The cutting machine includes a carriage 5 which is adapted to ride along a longitudinal track 6, as on a plurality of suitable front and rear wheels 7. Carriage 5 may be driven in either direction along track 6 by any suitable well-known mechanism, such as a motor 8 connected by a chain drive 9 to one of the said wheels.

Carriage 5 is adapted to support the slab cutting and guiding system for longitudinal movement. For this purpose, carriage 5 includes a housing 10 having a plurality of freely rotatable V-rollers 11 arranged to mount therebetween an elongated transversely extending beam or arm 12 which is cantilevered out to at least over slab 1. Arm 12 is shown as being of rectangular box section (see FIGS. 1 and 2) and is positioned so that two of its opposed corners 13 and 14 lie in a vertical plane and ride between V-rollers 11.

Arm 12 is adapted to be selectively moved along a transverse axis, as by an air cylinder 15 having one end 16 fixed to housing 10 and the other end 17 connected through an arm 18 to arm 12 adjacent slab 1.

The outer portion of arm 12 is adapted to carry a tool assembly 19 for cutting slab 1, and a guiding assembly 20 for guiding the tool during cutting.

Tool assembly 19 may be of any suitable well-known design and includes a support housing 21 which mounts a tool, such as a flame cutting torch 22 as well as a follower 23 which is adapted to contact the top face of slab 1. Torch 22 and follower 23 may be raised and lowered together, as by an air cylinder 24. Assembly 19 is shown as being rollingly suspended from arm 12, as by upper and lower V-rollers 25.

Assembly 19 is adjustable in a transverse direction along arm 12. For this purpose, a threaded shaft 26 extends along one side of arm 12 between carriage 5 and assembly 19. The front end of shaft 26 is rotatably mounted to a bearing block 27 fixed to arm 12 and is connected to a rotatable hand wheel 28. The rearward portion of shaft 26 extends through a threaded member 29 which is fixed to housing 21. Rotation of hand wheel 28 will turn shaft 26 in member 29, causing tool assembly 19 to move along arm 12.

When forming seam 2 to separate slab 1 into a plurality of separate sections, it is desirable to guide torch 22 so that each resultant slab section will be of uniform width throughout its length. Guiding assembly 20 is provided for this purpose and is adapted to followingly cooperate with slab edge 3. The concepts of the invention provide a unique guide mechanism adapted to eliminate problems created by corner deformities 4a.

Figure 2:
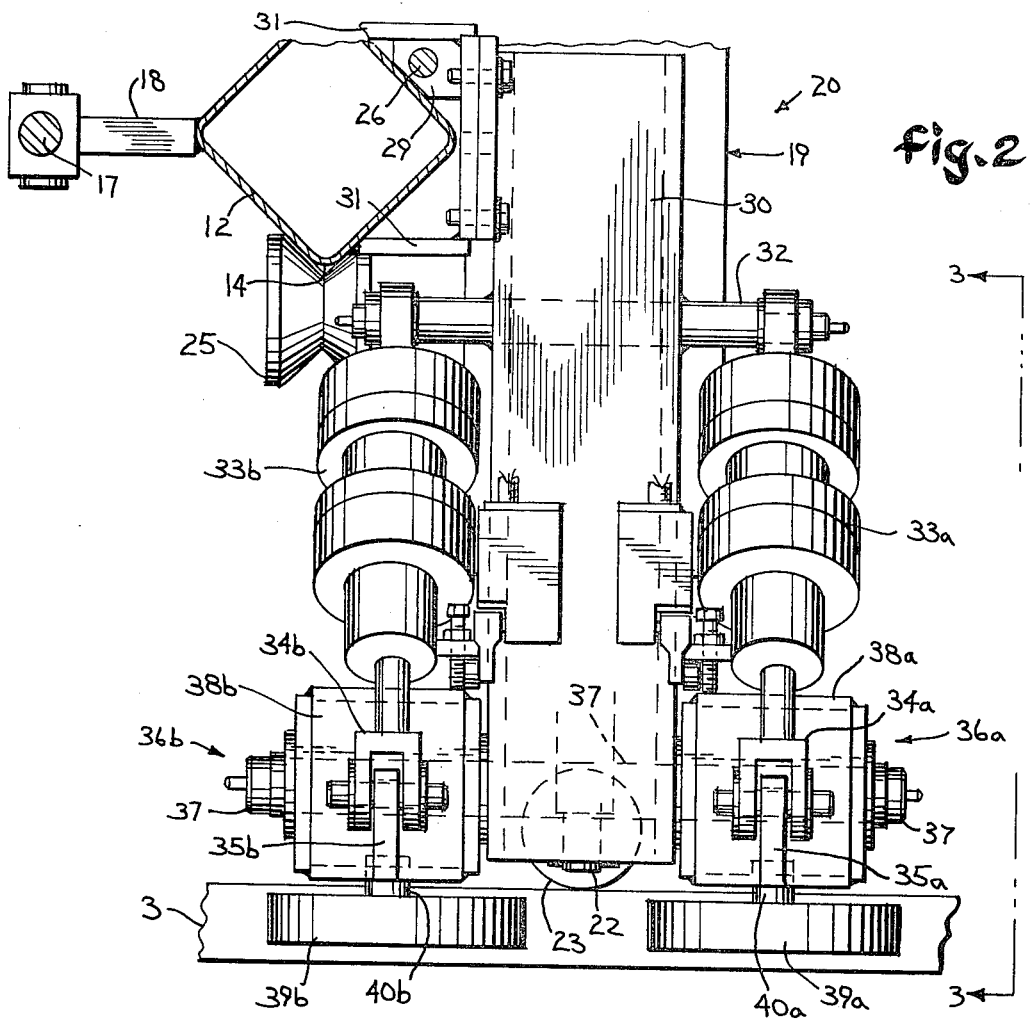
FIG. 2 is a vertical section taken on line 2—2 of FIG. 1.
Figure 3:
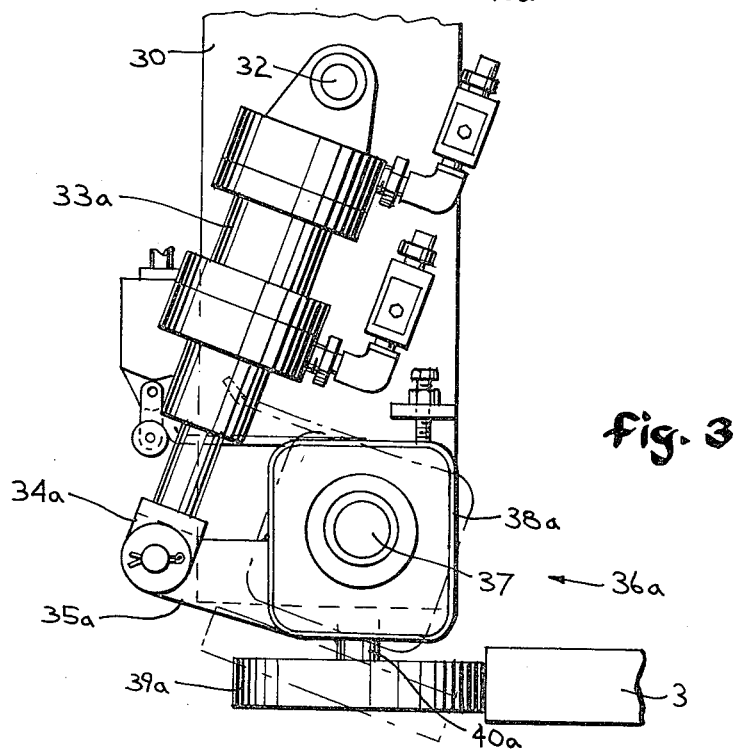
FIG. 3 is an enlarged side elevation of one of the roller position control mechanisms, taken on line 3—3 of FIG. 2.

Referring to FIGS. 1–3, assembly 20 comprises a support housing 30 which is fixedly secured to arm 12 by a pair of brackets 31 which over and underlie shaft 26. A longitudinally extending upper pivot shaft 32 extends through housing 30. The outer end portions of shaft 32 have pivotally mounted thereon the upper ends of downwardly extending air cylinders 33a, 33b. The lower ends of cylinders 33a and 33b have clevises 34a, 34b thereon which in turn are connected through crank arms 35a, 35b to roller assemblies 36a, 36b, to which the crank arms are fixedly attached.

Roller assemblies 36a, 36b are adapted to be pivotally mounted to the extremities of a longitudinally extending lower pivot shaft 37 which extends through housing 30. Assemblies 36a, 36b respectively comprise support housings 38a, 38b pivotally mounted on shaft 37, and from which are suspended guide members, such as longitudinally spaced rollers 39a, 39b which are adapted to cooperate with slab edge 3. Rollers 39a, 39b are rotatably connected to the lower faces of housings 38a, 38b by means of bearings 40a, 40b.

As can best be seen in FIG. 2, torch 22 lies in a transverse vertical plane which extends approximately midway between the rotational axes of guide rollers 39a and 39b.

Selective actuation of cylinders 33a, 33b suitably positions the guide rollers in either a forward horizontal position relative to slab edge 3, as per 39a in full lines in FIGS. 1 and 3, or in a retracted angular position, as per 39b in FIG. 1 and 39a in phantom in FIG. 3.

Motor 8 as well as air cylinders 15, 24 and 33a, 33b are illustrative of any suitable motive means which may in some instances be automatically actuated through an N/C-type control, or may be manually actuated. In the present embodiment, it is contemplated that the electrical and pneumatic controls are manually operated through a control panel 41 on carriage 5 in the usual well-known manner.

OPERATION

The mechanism is first set to provide the desired width of slab between edge 3 and seam 2. This is done by rotating handwheel 28 until assembly 19 is spaced from assembly 20 the desired distance.

Figure 4:
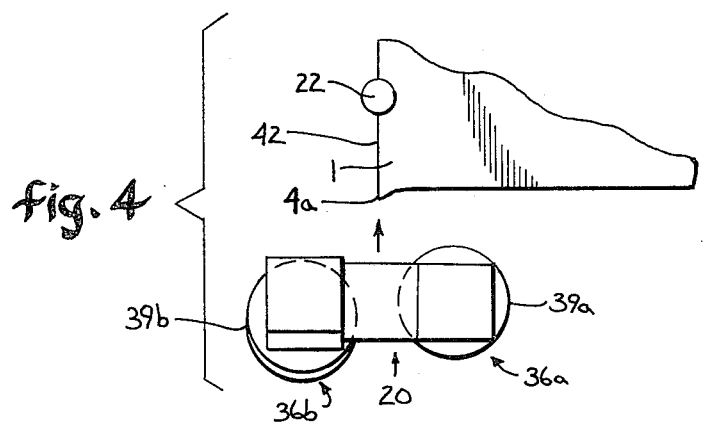
FIGS. 4–7 are schematic operational plan views sequentially showing the guided cutting of the slab.

Referring particularly to FIG. 4, carriage 5 is moved longitudinally on tracks 6 until torch 22 is positioned adjacent the upside transverse edge 42 of slab 1. Assuming that cutting is to proceed in a rightward direction, guide roller 39a will constitute the leading roller, while guide roller 39b will constitute the trailing roller. Since torch 22 is in a transverse plane extending between the two guide rollers, roller 39a will be positioned forwardly of edge 42 and deformity 4a, while roller 39b will be behind.

Cylinders 33a and 33b are then actuated so that leading roller 39a is pivotally advanced forwardly toward slab 1 to a horizontal position while trailing roller 39b is pivotally retracted away from slab 1 to a tilted position.

Figure 5:
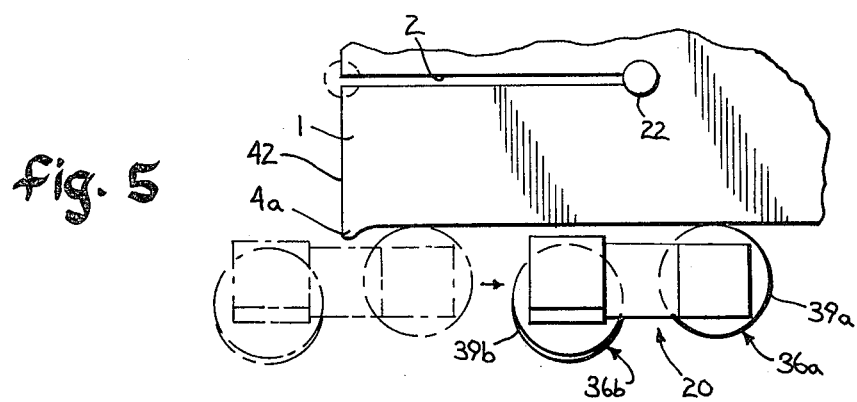

Cylinder 15 is then actuated to move arm 12 and assembly 20 transversely so that guide roller 39a biasingly engages slab edge 3. See the phantom position of FIG. 5. Note that the roller contact with edge 3 is remote from and ahead of deformity 4a.

As cutting starts, actuation of the usual torch controls and of carriage 5 will cause arm 12 to move rightwardly along the slab, carrying with it assemblies 19 and 20 and causing seam 2 to be cut. As guiding assembly 20 moves along the slab from the phantom position to full line position of FIG. 5, retracted trailing roller 39b will bypass deformity 4a altogether.

Figure 6:
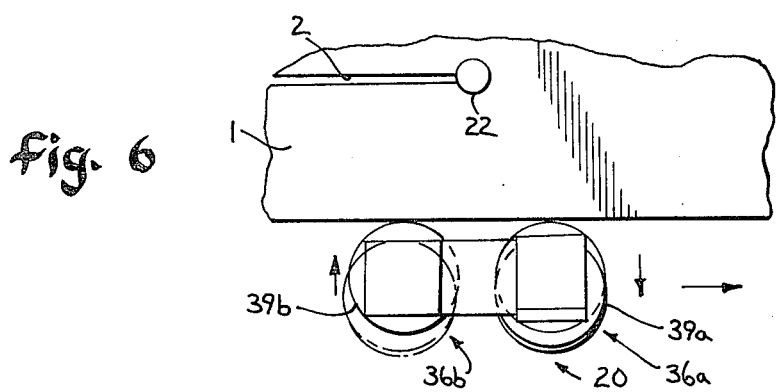

Turning to FIG. 6, as assembly 20 continues rightwardly, guide rollers 39a and 39b are actuated to reverse their pivotal positions. Thus, trailing roller 39b is advanced into guiding engagement with slab edge 3 while leading roller 39a is retracted away from the edge.

Figure 7:
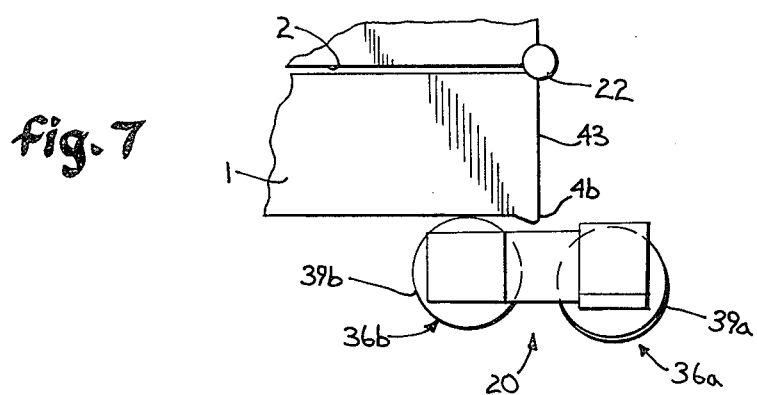

As shown in FIG. 7, when the downside edge 43 of slab 1 is reached, leading roller 39a, being retracted, will bypass any corner deformity 4b as torch 22 completes the cutting operation. Arm 12 is then pulled back to withdraw assembly 20 from the slab.

The concepts of the invention provide a unique system for guiding metal cutting tools and the like. By utilizing selective engagement of a pair of guide rollers with the workpiece edge, and wherein the cutting tool is effectively positioned in a transverse plane therebetween, contact with corner and possibly other deformities may be suitably prevented.

Various modes of carrying out the invention are contemplated as being within the scope of the following claims particularly pointing out and distinctly claiming the subject matter which is regarded as the invention:

I claim:

1. For use in a machine for cutting a seam in a metal workpiece with a longitudinally movable cutting tool, apparatus comprising:
    (a) tool guide means connected for longitudinal movement with said cutting tool and adapted to followingly contact the exposed longitudinal edge of the workpiece,
    (b) said tool guide means including selectively actuatable means to cause bypass of said contact with any deformed corners associated with said workpiece edge while maintaining guiding contact with said edge remote from said corners.

2. The apparatus of claim 1 wherein said tool guide means comprises:
    (a) a pair of guide members longitudinally spaced on either side of a transverse plane containing said cutting tool,
    (b) and motive means to selectively advance or retract each said guide member toward or away from the said workpiece edge.

3. The apparatus of claim 2 which includes motive means to move said guide members toward said workpiece so that a selectively advanced guide member is biased against said edge.

4. The apparatus of claim 1 wherein said tool guide means comprises:
    (a) a leading guide member and a trailing guide member, with said guide members being longitudinally spaced on either side of a transverse plane containing said cutting tool,
    (b) means to advance said leading guide member transversely into engagement with the workpiece edge downside of said corner at the start of cutting of the said seam,
    (c) and means to retract said trailing guide member in a transverse direction away from the workpiece at the said start of cutting,
    (d) said advancing and retracting means being actuatable in reverse during subsequent cutting so that said trailing guide member is in advanced workpiece-engaging position and said leading guide member is in retracted position.

5. The method of guiding a cutting tool in the formation of a longitudinal seam in a metal workpiece having a longitudinal edge with a starting corner comprising:
   (a) providing leading and trailing guide members operatively connected to said cutting tool and which are longitudinally spaced on either side of a transverse plane containing said tool,
   (b) positioning said tool adjacent said workpiece,
   (c) advancing said leading guide member transversely into engagement with said workpiece edge downside and remote from said starting corner,
   (d) retracting said trailing guide member transversely away from the workpiece,
   (e) moving said tool and guide members longitudinally along the workpiece,
   (f) and subsequently advancing said trailing guide member into work-engaging position, and retracting said leading guide member.

* * * * *